United States Patent
Lo et al.

(10) Patent No.: US 7,127,569 B2
(45) Date of Patent: Oct. 24, 2006

(54) INFORMATION HANDLING SYSTEM INCLUDING MEDIA DRIVE RESUME RECORDING FEATURE

(75) Inventors: Hong-Jing Lo, Austin, TX (US); Jason Goertz, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 302 days.

(21) Appl. No.: 10/794,036

(22) Filed: Mar. 5, 2004

(65) Prior Publication Data

US 2005/0198432 A1    Sep. 8, 2005

(51) Int. Cl.
G06F 12/00    (2006.01)
(52) U.S. Cl. .................. 711/154; 711/112; 713/300
(58) Field of Classification Search ............... 711/112; 713/300
See application file for complete search history.

(56) References Cited

U.S. PATENT DOCUMENTS

| | | | |
|---|---|---|---|
| 5,485,623 A * | 1/1996 | Kurokawa et al. ............ | 714/22 |
| 5,819,114 A | 10/1998 | Behnke | |
| 6,538,962 B1 | 3/2003 | Hyun | |
| 2002/0101803 A1 | 8/2002 | Hayashi et al. | |
| 2003/0016602 A1 | 1/2003 | Wada et al. | |
| 2003/0107962 A1 | 6/2003 | Kwon | |
| 2003/0165097 A1 | 9/2003 | Tseng et al. | |
| 2004/0004920 A1 | 1/2004 | Jung et al. | |

OTHER PUBLICATIONS

Acer Computer Philippines, "Acer CDRW 6424MU", ACER News, (Jun. 16-30, 2001), p. 2, vol. 2, Issue 14.
Bennett, Graeme, "A Look at CD Writers with Coaster Prevention Technology", Bennett Arts Ltd, 2002.
CDRLabs Inc., "Acer MiniRW CRW-6424MU", 2001.
Controlled Copy Support Systems Inc., "CD Color Books Question and Answers", 2003.
Hardware One, "Buffer Underrun Protection Technologies", 2001.
Jupitermedia Corporation, "Buffer Underrun", 2003.
Plextor Europe, "DVD-Recorder—PX—708A", 2004.
Richter, Michael, "Buffer Underruns", 2003.
Sanyo Electric, Co., Ltd., "Burn-Proof Features", 2004.
Sanyo Laser Products, Inc., "Glossary", 2002.
Starrett, Bob, The Truth About Buffer Underruns (in Windows), 2000, Roxio CD-R newsletters.
Yamaha Corporation, "Buffer Underrun Protection Technology", 2001.

* cited by examiner

*Primary Examiner*—Matthew Kim
*Assistant Examiner*—Lev Iwashko
(74) *Attorney, Agent, or Firm*—Haynes and Boone, LLP

(57) ABSTRACT

An information handling system (IHS) is provided that permits continued recording of a medium when a planned power loss occurs while the medium is being recorded in a media drive. If a low power condition is encountered during recording, the IHS saves location information regarding a last written block prior to the planned power loss. When power is restored, recording resumes at a location related to the location information.

15 Claims, 2 Drawing Sheets

INFORMATION HANDLING SYSTEM INCLUDING MEDIA DRIVE RESUME RECORDING FEATURE

BACKGROUND

The disclosures herein relate generally to information handling systems (IHS's) and more particularly to IHS's including media drives.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHS's often include media drives such as CD and DVD drives for reading and writing information on removable media. These drives are often used to pre-master content. Pre-mastering is a process that takes source data and creates a disk in the desired format, for example, CD or DVD format. One prerequisite of pre-mastering is uninterrupted recording. Media drives typically include buffers to lessen the likelihood that the data stream to the drive will be interrupted. However, even with large buffers, it is possible that the buffer will run out of data and a buffer underrun will occur. When such a buffer underrun occurred in older drives, the disk medium was rendered useless after the underrun and interruption in writing data to the disk medium.

One attempt to lessen the impact of buffer underrun during recording is to monitor the amount of data in the buffer. When the amount of data in the buffer becomes less that a predetermined amount, the drive writes a link on the disk medium and waits. The link is interpreted as an error block. When the buffer is refilled to an appropriate level, the drive starts recording after the error block or link. More advanced drives without linking are now available that enable a resumption of recording at the location on the disk medium where the interruption occurred.

Portable battery powered IHS's encounter another problem when recording to a disk medium. More particularly, problems occur when the IHS encounters a low power condition such as a critical battery warning at the same time the IHS is writing information to the media drive. If the recording is not completed before the battery runs out of energy, the IHS will force a shutdown. In that event the recording will terminate prematurely and the disk medium in the drive is rendered useless.

What is needed is an IHS which addresses the media drive problems discussed above.

SUMMARY

Accordingly, in one embodiment, a method is disclosed for operating an information handling system (IHS) including a media drive. The method includes writing, by the media drive, data on a medium in the media drive. The method also includes detecting a low power condition, and storing resume writing information in a nonvolatile storage in the IHS in response to detecting the low power condition. The method further includes detecting when power is restored to the IHS and, in response, resuming writing at a location determined from the resume writing information.

In another embodiment, an information handling system (IHS) is disclosed which includes a processor and a memory coupled to the processor. The IHS also includes a media drive, coupled to the processor, that records information to a medium therein. The IHS further includes a non-volatile storage, coupled to the processor, for storing instructions that when executed by the processor cause writing, by the media drive, data on the medium. The instructions also cause detecting a low power condition and storing resume writing information in the nonvolatile storage in response to detecting the low power condition. The instructions also cause the resumption of writing at a location determined from the resume writing information in response to detecting restoration of power to the IHS.

DETAILED DESCRIPTION

Figure 1:
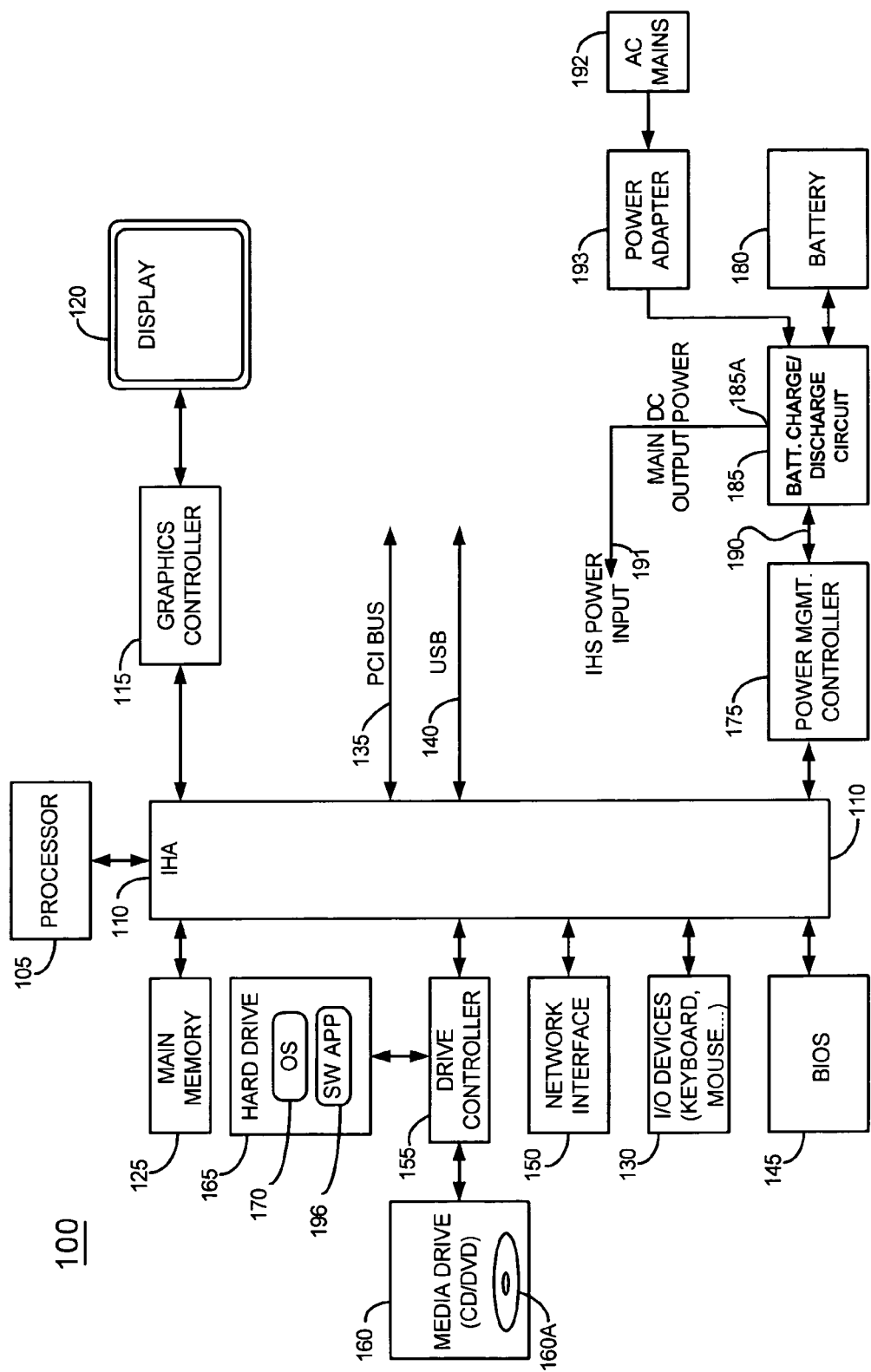
FIG. 1 is a block diagram of an embodiment of the disclosed information handling system (IHS).

FIG. 1 is a block diagram of the disclosed information handling system (IHS) 100. For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In one embodiment, IHS 100 includes a processor 105 such as an Intel Pentium series processor or one of many other processors currently available. An Intel Hub Architecture (IHA) chipset 110 provides IHS 100 with logic that connects processor 105 to other components of IHS 100. Chipset 110 carries out graphics/memory controller hub functions and I/O controller functions as well. Chipset 110 acts as a host controller which communicates with a graphics controller 115 coupled thereto. Graphics controller 115 is coupled to a display 120. Chipset 110 also acts as a controller for main memory 125 which is coupled thereto.

Input devices 130 such as a mouse, keyboard, and tablet, are coupled to chipset 110. An expansion bus 135, such as a Peripheral Component Interconnect (PCI) bus, PCI Express bus, SATA bus or other bus is coupled to chipset 110 as shown to enable IHS 100 to be connected to other devices which provide IHS 100 with additional functionality. A peripheral device bus 140 such as a universal serial bus (USB) is coupled to chipset 110 as shown. System basic input-output system (BIOS) 145 is coupled to chipset 110 as shown. A nonvolatile memory such as CMOS or FLASH memory is used to store BIOS software 145. A network interface controller (NIC) 150 is coupled to chipset 110 to facilitate connection of system 100 to other information handling systems.

A media drive controller 155 is coupled to the chipset 110 so that devices such as media drive 160 and nonvolatile storage drive 165 can be connected to chipset 110 and processor 105. Devices that can be coupled to media drive controller 155 include CD-ROM drives, DVD drives, hard disk drives and other fixed or removable media drives. In one embodiment, media drive 160 is a drive that accommodates removable media such as a recordable CD medium 160A or a DVD medium 160A. IHS 100 includes an operating system 170 which is stored on nonvolatile storage drive 165. Typical operating systems which can be stored on nonvolatile storage drive 165 include Microsoft Windows XP and the Linux operating systems. (Microsoft and Windows are trademarks of Microsoft Corporation.)

IHS 100 includes a power management controller (PMC) 175 that controls the distribution of power throughout the IHS. A battery 180 is coupled to a battery charge/discharge switching circuit 185 which is coupled to PMC 175 by a system management bus (SMBus) 190. Battery charge/discharge switching circuit 185 includes a main DC power output 185A that is coupled to IHS power input 191. Battery charge/discharge switching circuit 185 is coupled to the AC mains 192 by a power adapter 193 as shown. In this manner, IHS 100 can be powered either by AC mains 192 or DC battery 180 when IHS 100 is not coupled to a source of AC power.

A recording software application 196 is stored in nonvolatile storage 165 to detect when battery power in the IHS is running low, and in that event, software application 196 stops the recording on medium 160A in media drive 160 and stores media location information on non-volatile storage 165 indicating where on the disk medium 160A recording should resume when power is restored. The location information may be the address of the last recorded data and, in that event, recording would resume at the next available address on the medium when power is restored. The location information could also be the address of the next available location, and in that event, recording would resume at that address when power is restored. This location information may also be called resume writing information. Now that the location information, or resume writing information, is stored away, recording on medium 160A is stopped and the IHS can power down in response to the critical battery warning.

Figure 2:
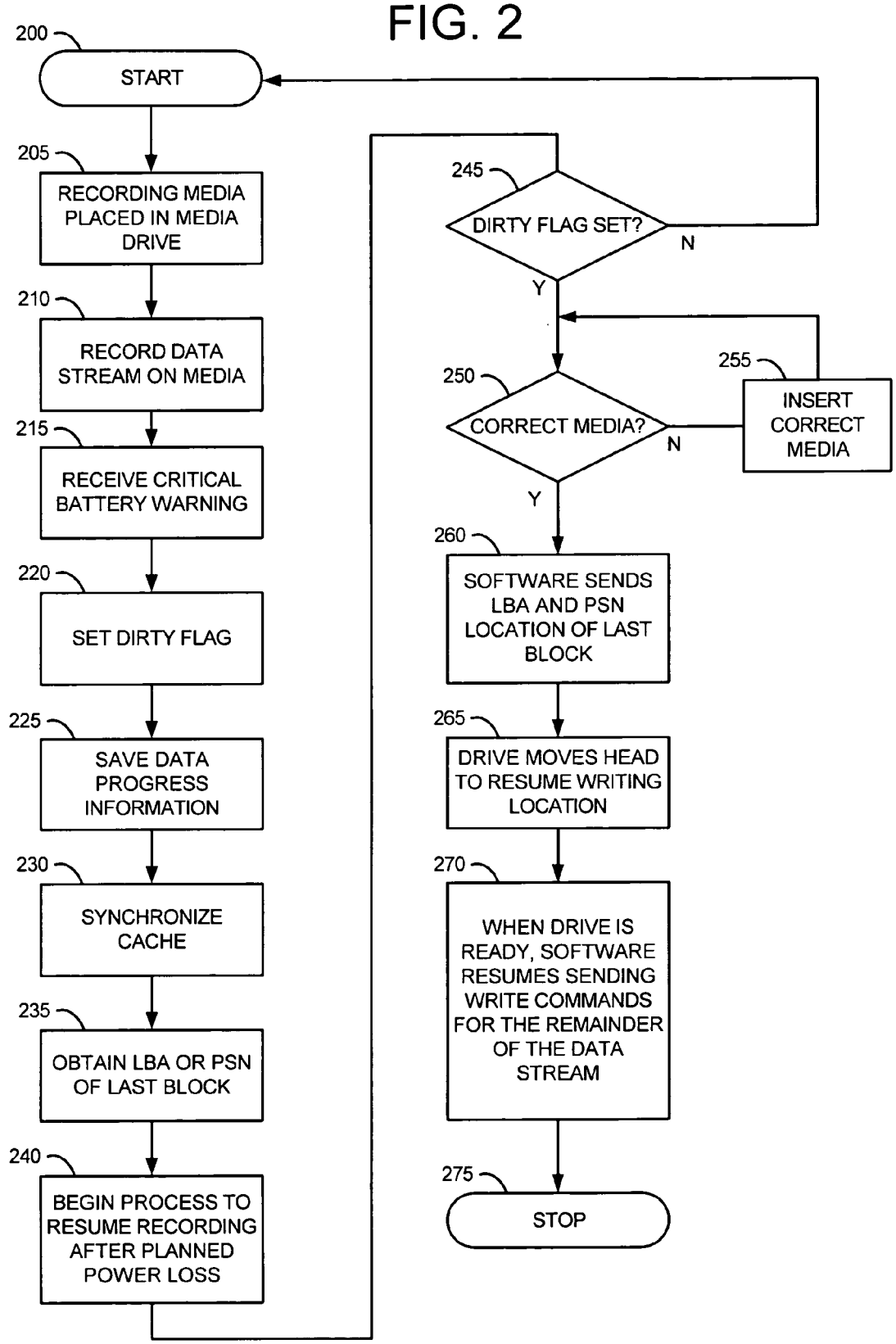
FIG. 2 is a flowchart depicting an embodiment of process flow in the disclosed IHS.

FIG. 2 is a flowchart showing more detail in the process flow of software application 196 while it governs the recording of a medium 160A in media drive 160. Process flow commences at start block 200. A CD, DVD or other recordable medium 160a is placed in media drive 160 as per block 205. A data stream is sent to drive controller 155 and recording on medium 160A commences as per block 210. While the recording is being made, software application 196 receives a critical battery warning from operating system 170 as per block 215. The critical battery warning indicates that battery power is low and that the IHS will soon shutdown. In response to receiving the critical battery warning, the software application sets a dirty flag to indicate interruption in the recording of the data stream by IHS shutdown. The dirty flag can be stored in hard drive 165 or other non-volatile storage as a registry key setting or other file. Data progress information is then saved as per block 225. The data progress information contains information regarding how many logical blocks of user data have been transferred from the IHS to the media drive thus far during the recording process. A cache (not shown) in media drive 160 is then synchronized as per block 230. In this step, the contents of the cache are written to media 160 before recording is stopped and/or IHS shutdown. As per block 235, software application 196 then obtains the last logical block address (LBA), if the medium is a CD, or the last physical sector number (PSN), if the medium is a DVD, once the last bit of information is written out of cache. The last LBA or PSN is stored in non-volatile storage 165 so that this location information is available for retrieval once power to the IHS is restored. Now that this location information, or resume writing information, is stored away, recording on medium 160A ceases and the IHS can power down in response to the critical battery warning. The above sequence of blocks may be referred to as a planned power loss sequence.

When power is restored to IHS 100, operating system 170 and software application 170 again load. Software application 196 then takes action to resume recording after the planned power loss as per block 240. Software application 196 checks to determine if the dirty flag is set at decision block 245. If the dirty flag is not set, then this is interpreted as meaning that a prior recording was not interrupted and process flow continues back to start block 200. However, if it is determined that the dirty flag is set, then this signifies that a recording of a medium occurred but was not completed because a planned power loss interruption occurred. In this event, process flow continues to decision block 250 at which a test is conducted to determine if the medium 160A presently in media drive 160 is the correct medium, namely the medium that was in the media drive when the planned power loss occurred. One manner the software application uses to make this determination is to check the medium currently in the media drive to determine if the medium has the same volume label as the medium in the media drive prior to the planned shutdown. The number of logical blocks of user data stored on the current medium is also checked to see if it is the same number of logical blocks as the medium in the media drive prior to the planned shutdown. To make this test possible, both the volume label and the number of logical blocks stored in the medium are stored in non-volatile store prior to the planned shutdown. Returning to the flowchart, if the correct medium is not in the media drive, then the user is prompted to insert the correct medium at block 255 and the medium is retested by decision block 250. Once the correct medium is found to be in the media drive, the location information or resume writing information is retrieved from non-volatile storage 165 as per block 260. In one embodiment, the location information is the LBA or PSN of the last block written. In another embodiment, the location information is the LBA or PSN of the next block that is available for writing after the last block was written prior to the planned power loss. Media drive 160 then resumes writing at the designated location on medium 160A. In more detail, if the location information is the LBA or PSN of the last block written, the drive 160 resumes writing a next available block. Alternatively, if the location information is the LBA or PSN of a next block available after the last block is written, then drive 160 resumes writing at that block. To accomplish this, drive 160 moves its read/write head to the designated location, as per block 265, and resumes writing the remainder of the data stream as per block 270. The process ends at block 275 and can be repeated by returning to start block 200.

An information handling system is thus disclosed which avoids rendering a medium useless when a planned power loss occurs while the medium is being recorded in a media drive.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. An information handling system (IHS) comprising:
    a processor;
    a memory coupled to the processor;
    a media drive, coupled to the processor, that records information to a medium therein; and
    a non-volatile storage, coupled to the processor, for storing instructions that when executed by the processor cause:
        writing, by the media drive, data on the medium;
        detecting a low power condition;
        saving data progress information;
        obtaining resume writing information including one of a logical block address (LBA) and a last physical sector number (PSN);
        storing the resume writing information in the nonvolatile storage;
        powering down the IHS in response to detecting the low power condition; and
        in response to detecting restoration of power to the IHS, resuming writing at a location determined from the resume writing information.

2. The IHS of claim 1 wherein the resume writing information is the last address on the medium at which information was written.

3. The IHS of claim 1 wherein the resume writing information is a next address on the medium at which information is to be written.

4. The IHS of claim 1 wherein the IHS is a portable IHS.

5. The IHS of claim 1 wherein the IHS is battery-powered.

6. The IHS of claim 1 wherein the low power condition is a critical battery warning.

7. The IHS of claim 1 wherein an operating system of the IHS detects the low power condition.

8. A method of operating an information handling system (IHS) including a media drive, the method comprising:
    writing, by the media drive, data on a medium in the media drive;
    detecting a low power condition;
    saving data progress information;
    obtaining resume writing information including one of a logical block address (LBA) and a last physical sector number (PSN);
    storing the resume writing information on a nonvolatile storage in the IHS;
    powering down the IHS in response to detecting the low power condition; and
    detecting when power is restored to the IHS and in response resuming writing at a location determined from the resume writing information.

9. The method of claim 8 wherein the resume writing information is the last address on the medium at which information was written.

10. The method of claim 8 wherein the resume writing information is a next address on the medium at which information is to be written.

11. The method of claim 8 wherein the IHS is a portable IHS.

12. The method of claim 8 wherein the IHS is battery-powered.

13. The method of claim 8 wherein the low power condition is a critical battery warning.

14. The method of claim 8 wherein an operating system of the IHS detects the low power condition.

15. A portable information handling system (IHS) comprising:
    a processor;
    a media drive, coupled to the processor, that records information to a medium therein; and
    a non-volatile storage, coupled to the processor, for storing instructions that when executed by the processor cause:
        writing, by the media drive, data on the medium;
        detecting a low power condition;
        saving data progress information;
        obtaining resume writing information including one of a logical block address (LBA) and a last physical sector number (PSN);
        storing the resume writing information in the nonvolatile storage;
        powering down the IHS in response to detecting the low power condition; and
        in response to detecting restoration of power to the IHS, resuming writing at a location determined from the resume writing information.

* * * * *